US005970476A

United States Patent [19]
Fahey

[11] Patent Number: 5,970,476
[45] Date of Patent: Oct. 19, 1999

[54] METHOD AND APPARATUS FOR INDUSTRIAL DATA ACQUISITION AND PRODUCT COSTING

[75] Inventor: Bill G. Fahey, Madison, Ohio

[73] Assignee: Manufacturing Management Systems, Inc., Madison, Ohio

[21] Appl. No.: 08/715,552

[22] Filed: Sep. 19, 1996

[51] Int. Cl.[6] .................................................. H04L 27/00
[52] U.S. Cl. .................................. 705/28; 705/29; 707/1; 707/10; 707/100
[58] Field of Search ........................... 705/28, 29; 707/1, 707/10, 100, 102, 200

[56] References Cited

U.S. PATENT DOCUMENTS

| | | | |
|---|---|---|---|
| 4,757,267 | 7/1988 | Riskin | 379/113 |
| 4,954,958 | 9/1990 | Savage et al. | 364/444 |
| 5,191,522 | 3/1993 | Bosco et al. | 364/401 |
| 5,201,046 | 4/1993 | Goldberg et al. | 395/600 |
| 5,226,118 | 7/1993 | Baker et al. | 395/161 |
| 5,249,120 | 9/1993 | Foley | 705/1 |
| 5,301,320 | 4/1994 | McAtee et al. | 395/650 |
| 5,303,367 | 4/1994 | Leenstra et al. | 395/600 |
| 5,305,434 | 4/1994 | Ballard et al. | 395/155 |
| 5,311,437 | 5/1994 | Leal et al. | 364/468 |
| 5,388,196 | 2/1995 | Pajak | 95/159 |
| 5,437,027 | 7/1995 | Bannon et al. | 395/600 |
| 5,528,490 | 6/1996 | Hill | 364/403 |

OTHER PUBLICATIONS

Fahey, Bill G., Building an ABC Data Warehouse, Management Accounting, Mar. 1996.
Francett, Barbara, Database Technologies Vie for Data Warehouse Occupancy, Software Magazine, Apr. 1995.
Laney, Doug, Industry Analysis: All Roads Lead to the Data Warehouse.
Oracle Creative Services and Early Gee Design, the Executive's Guide to Building a Data Warehouse, Oracle Corporation 1995.
Rottenberg, Alan, Sr., Industry Analysis: Demands for Data Create New Opportunities.
Swanson, Doug, Industry Analysis: The Expanding Role of Middlware in Data Warehousing.
Industry Analysis: The Smart Warehouse Solution (From the Back Office to the Front Lines).

*Primary Examiner*—Thomas R. Peeso
*Attorney, Agent, or Firm*—Benesch, Friedlander, Coplan & Aronoff LLP

[57] ABSTRACT

An information storage, processing, and reporting system (20) for tracing enterprise wide product data, the system comprises a data storage (23, 26, 50) is adapted for storing data (106, 120, 112, 108) entries related to a product family. The data is received in a data warehouse system (42). The data is cataloged (54, 56, 58, 62). Cataloging the related data includes identifying data elements related to selected product families. The system indexes (70, 140, 144, 148, 149, 159, 169, 179) the identified data elements which are related to a selected first product family in accordance with the data representative thereof. Interconnected tables 140, 144, 148, 149, 159, 169, 179 are used for grouping indexed data elements pursuant to data representative of selected criterion. A storage medium (50) is adapted for storing the grouped data elements in a relational database (52). A digital processor (44) processes (36, 38, 116, 128) the grouped data elements in accordance with Activity Based Cost criteria. The memory medium (50) is adapted for storing the processed data (122, 110, 114, 124, 56, 54) in a relational database structure (52).

30 Claims, 10 Drawing Sheets

| (e) SALES DATA ||||
|---|---|---|---|
| FAMILY ID | PERIOD | SALES | MATERIAL COSTS |
| | | | |
| | | | |
| | | | |

*Fig. 4E*

| (f) PRODUCT DATA |||||
|---|---|---|---|---|
| PART NO. | FAMILY ID | LIST PRICE | DISCOUNT | COSTS |
| | | | | |
| | | | | |
| | | | | |

*Fig. 4F*

| (g) DRIVER DATA |||||||
|---|---|---|---|---|---|---|
| ID NO. | NAME | MONTH | FAMILY ID | QUANTITY | PERIOD | UNIT COST |
| | | | | | | |
| | | | | | | |
| | | | | | | |

*Fig. 4G*

METHOD AND APPARATUS FOR INDUSTRIAL DATA ACQUISITION AND PRODUCT COSTING

BACKGROUND OF THE INVENTION

The present invention relates generally to computer database systems and is particularly directed to a method and system using a relational database as a data warehouse for storing and retrieving enterprise-wide activity based data related to a product family.

A data warehouse is maintained in a computer storage device. The data stored in the data warehouse is automatically collected from operational systems at predetermined intervals and is organized to provide analytical information. Typically, the data stored in a data warehouse is used for Decision Support Systems ("DSS"), used by senior management in a company to assist in strategic planning. In traditional systems production and indirect support costs are allocated to products using volume oriented bases such as direct labor hours, direct labor dollars, production costs, and material costs. However, in a traditional DSS, enterprise wide production and indirect support costs are not assigned to specific product families in proportion to the demand for the specific indirect support costs that each product family requires.

It is desirable to provide a data warehouse which contains data that more accurately reflects the enterprise wide production and indirect support costs attributed to product families and individual products. It is further desirable to assign proportionate amounts of enterprise wide production and indirect support costs in response to a measurable quantity associated with the specific product family or product.

SUMMARY OF THE INVENTION

In accordance with one embodiment of the present invention, an information storage, processing, and reporting system for tracing enterprise wide product data comprises a data storage adapted for storing data entries related to a product family. A data storage medium is adapted for receiving related data for a product from the data storage. A data warehouse system catalogs the related data about the product families. The data warehouse system includes functionality for identifying data elements related to selected product families. The identified data elements are indexed according to a data structure into tables which are related to a selected first product family in accordance with data representative thereof. The data tables are grouped according to the indexed data elements pursuant to data representative of selected criterion. A memory medium is adapted for storing the grouped data elements in a relational database. A digital processor processes the grouped data elements in accordance with Activity Based Cost criteria. The memory medium is adapted for storing the processed data in the relational database structure.

In accordance with another aspect of the present invention, a method is provided for information storage, processing, and reporting for tracing enterprise wide product data. The method includes the steps of storing data entries related to a product family. The method includes receiving the stored related data for a product and cataloging the related data about the product families. The step of cataloging related data includes the steps of identifying data elements related to selected product families. The method further includes the step of indexing the identified data elements which are related to a selected first product family in accordance with data representative thereof. Also included is the step of grouping the indexed data elements pursuant to data representative of selected criterion. The grouped data elements are stored in a relational database. The method further includes processing the grouped data elements in a digital processor in accordance with Activity Based Cost criteria and storing the processed data in a relational database structure.

The present invention uses (i) automated data collection, (ii) a relational database repository data warehouse, and, (iii) specific data structures and related data tables to control the selection and flow of data to more accurately trace and allocate the cost of resources used to design, manufacture, and distribute a product.

An advantage of the present invention is the provision of a system for assigning enterprise wide production and indirect support costs to a particular product in proportion to the demand for those enterprise wide production indirect support costs in response to preselected measured units attributed to the specific product families. This use of measurable activity drivers in tracing production and indirect support costs to product families and individual products is a key advantage of the system of the present invention.

Yet another advantage of the present invention is the provision of a system for implementing a sustainable and efficient system for proportionately assigning the enterprise wide production and indirect support costs.

Yet a further advantage of the present invention is the provision for automatic collection of data from independent data systems, internal and external to the enterprise, at predetermined intervals.

Another advantage of the present invention is the extraction of data for summaries of transaction based information from operational database systems. The summarized extracted data is stored and used to produce activity based analytical data without requiring substantial alteration to the existing operational database systems.

Yet another advantage of the data structure and related data tables of the present invention is the more efficient and effective access to enterprise wide activity based management information used to support strategic decision making with respect to pricing strategies, profit planning, product mix, outsourcing, cost controls, capital investments, and services provided to customers.

A further advantage of the present invention is the integration of a plurality of software subsystems into a data warehouse structure.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein:

FIG. 3 is a data field structure for use in the present invention;

FIGS. 4A–4G are representations of tables of data for use in the data warehouse of FIG. 1;

DETAILED DESCRIPTION OF THE PREFERRED EMBODIMENT

Figure 1A:
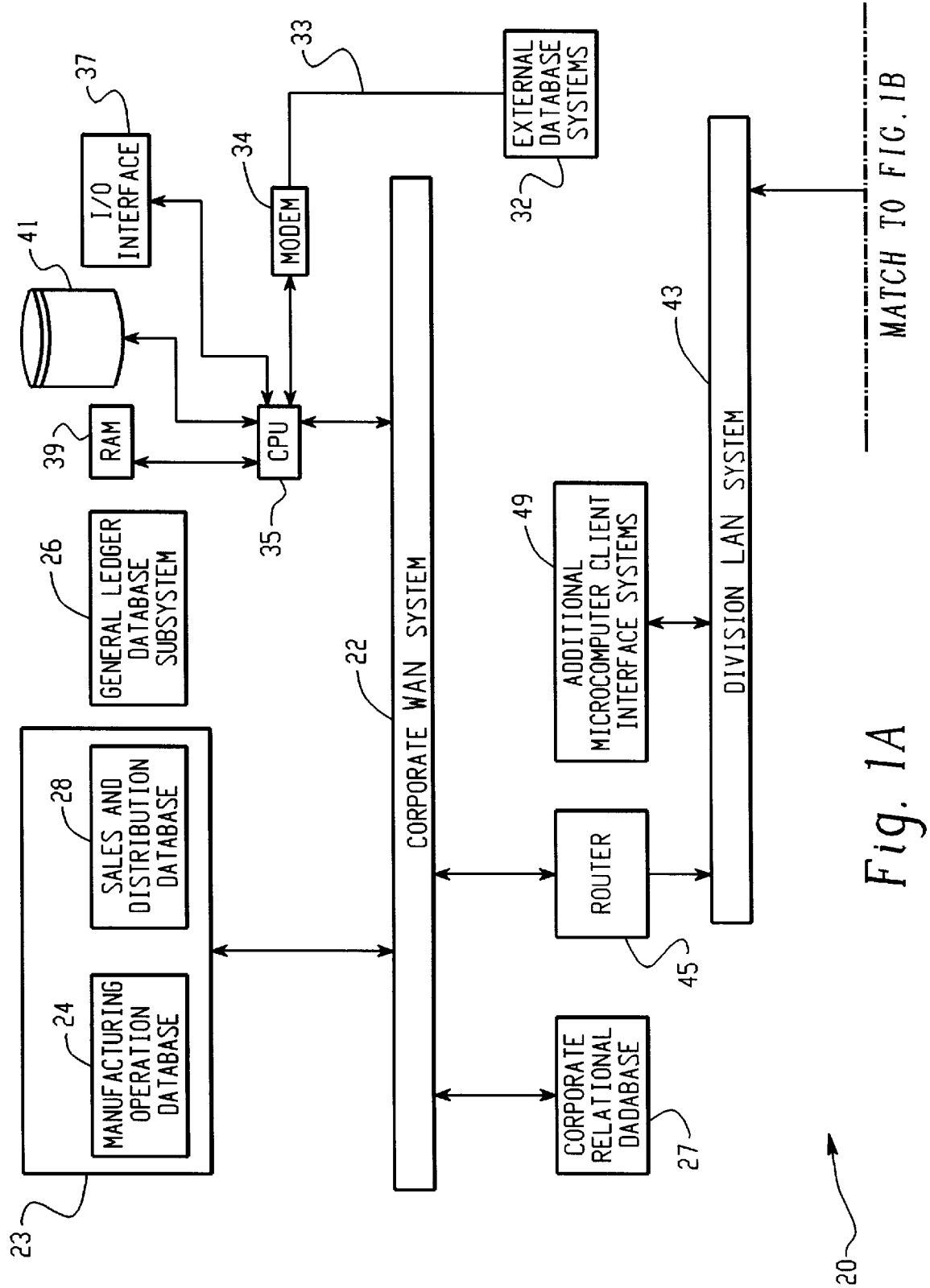
FIG. 1 is a schematic block diagram of a computer system for implementing the present invention.
Figure 1B:
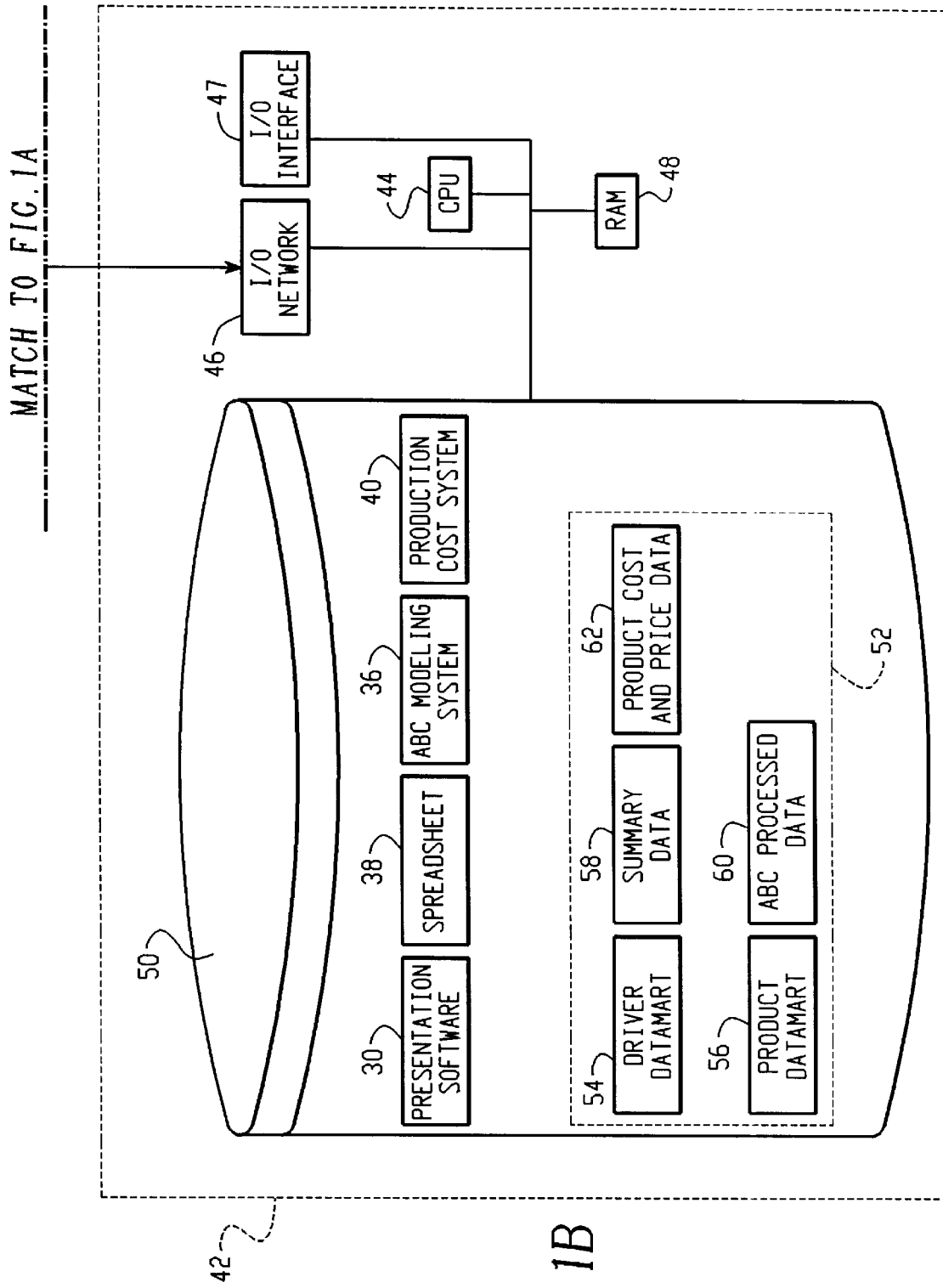

Referring now to the drawings wherein the showings are for the purposes of illustrating the preferred embodiment of the invention only and not for purposes of limiting same, FIGS. 1A and 1B illustrates a system 20 for assigning enterprise wide production and indirect support costs to a product family in a proportionate to the actual amount of the production and indirect support cost accrued for the product family. A product family is a grouping of products having a common characteristic or attribute. In addition, a product family may be determined by comparison to an independent standard.

Included in the system 20 is a Wide Area Network ("WAN") 22. The WAN system 22 is in data communications with a plurality of databases and independent computer platforms having subsystems. A manufacturing database system 24 and a sales and distribution database system 28 reside on a corporate mainframe computer system 23. The mainframe computer system 23 is in data communication with the WAN system 22. A general ledger database subsystem 26 and a corporate relational database 27 are in data communication with the WAN system 22. Preferably, the general ledger database subsystem 26 is a local area network ("LAN") system having a file server, central processor unit ("CPU"), random access memory ("RAM"), memory, and I/O interface devices. The general ledger database contains the financial information of a company. The corporate relational database 27 receives periodic uploads from a plurality of divisional ABC warehouse systems. This relational database system provides selected analytical information for corporate level Decision Support Systems ("DSS").

An external database 32 is in data communication with the WAN system 22 via a communication line 33, a modem 34 and a CPU 35. The CPU 35 has an I/O interface device 37, RAM 39, and a memory device 41. Typical databases might include any of a number of commercially available or private databases accessible through the communication line 33.

The WAN system 22 is in data communication with a division LAN system 43 via a router 45. The router 45 coordinates communications traffic between the WAN system 22 and the division LAN system 43.

The division LAN system is in data communication with a data warehouse system 42 and additional microcomputer systems 49. The data warehouse system 42 includes a CPU 44. Preferably, the CPU 44 is an INTEL® PENTIUM™ based processor in data communication with a network interface 46 for coordinating communications with the division LAN system 43. The data warehouse system 42 includes a RAM 48, an I/O interface 47, and a data storage medium 50.

Each of the additional microcomputer systems 49 make up end user I/O terminals for presenting queries to and obtaining reports from the data warehouse system 42. Each microcomputer includes a CPU, RAM, and non-volatile memory such that the client system has access to the divisional LAN system 43, as is known in the art.

The data storage system 50 houses a plurality of database and subsystems for transforming, cleansing, scrubbing, processing, and storing data from (i) the databases located on the WAN system 22, (ii) within the data warehouse 42, and (iii) external database systems 32.

A multi-dimensional presentation subsystem 30 provides reports relevant to the current status of enterprise wide performance indicators. For example, typical reports generated by the multi-dimensional presentation software 30 include (i) top ten; such as the profitability of the top ten product families, (ii) rank position; ranking top products, customers, salespeople, and show rank comparisons between periods or regions, including international and domestic, (iii) exception highlight; specifically identifying items that meet a predetermined threshold evaluation such as the value of % change of a desired quantity, an example includes a high percentage of negative growth in a particular area, (iv) net change; by product family, region etc., (v) proportion of business; illustrating growth areas in the enterprise, (vi) variance trend; cluster charts for tracking variances and indicating the direction the variance is taking (vii) percent of plan; e.g. sales as a % of the plan, (viii) briefing book; a customized collection of reports periodically generated for specific managers preferences. Typical activity based data included in the reports listed above include data grouped by (i) product family; sales, material cost of sales, assigned operating costs by activity function and center, operating profit, and units shipped, (ii) activity center; assigned operating costs, activity driver, driver quantities, and unit driver cost, (iii) plant/site; assigned operating costs by activity category, activity function, and activity center, driver unit costs by activity center and units produced, (iv) specific product; sales, material cost of sales, direct production costs, support costs, discounts, margin rates, price comparisons, (v) period; trend lines on the data listed above for a plurality of periods. Suitable subsystems for executing the presentation subsystem 30 in the present invention are (i) PowerPlay made by Cognos, Inc., located in Ottawa, Canada, and (ii) Pilot Lightship made by Pilot Software located in Cambridge, Mass.

An Activity Based Cost ("ABC") modeling subsystem 36 is used to trace enterprise wide operational costs to categories of products (product families) or customers using activity drivers. Operating costs are developed by resource category within the corporate accounting system in the general ledger database 26. A resource category is a cost associated with the operation of the business enterprise. The resource categories include costs associated with; wages and salaries, benefits, equipment, supplies, utilities, professional services, computer services, buildings and other costs. These resource category operating costs are then linked to a principal activity transaction driver for each activity center. For example, a principal activity driver for direct production activity centers is production hours. An activity center is a highest level of activity where people and equipment are assigned, e.g. departments within a manufacturing operation. Other typical activity drivers for activity centers are; (i) units received/receiving, (ii) units stored/warehouse, (iii) units shipped/shipping, packaging, (iv) persons employed/personnel, (v) space occupied/building occupancy, (vi) net sales dollars/corporate (administrative), (vii) man hours/ engineering, laboratory, quality control, (viii) purchase orders/division management, scheduling, purchasing, (ix) shop orders/ division management, scheduling, material issuing, plant management, (x) sales orders/sales and marketing, (xi) returns/technical service, customer service. Some additional activity drivers that are applied to appropriate activity centers include; machine set up hours, machine runtime hours, treating hours, percent of effort, unit conversion costs, CPU hours, number of customers, number of active parts, number of purchase orders, technical evaluation requests, requests for quotations, number of special manufacture orders, number of regional orders. One skilled in the art will appreciate that the activity drivers listed above are measurable during the manufacturing or business process. The appropriate measurable activity drivers are used to assign the production and indirect accumulated costs to specific product families and products.

A unit cost driver is determined and applied to a driver quantity assigned to each category of product (product family) or service provided to a customer. A unit cost driver is the dollar amount per activity driver quantity and a driver quantity is a quantifiable unit of output for a specific business activity. The use of measured drivers to apply enterprise wide costs to product families results in proportionate assignment of production and indirect support costs to product families more accurately related to actual demand for those costs. The cumulative value added cost assignments from the activity centers throughout the enterprise are then matched to sales and material costs for each product family. More accurate application of production and support costs provides more accurate profitability data for each category of product or service. The data from the various databases is selected and processed according to principles of Activity Based Cost analysis as described is "Emerging Practices in Cost Management", published by Warren, Gorham & Lamont in New York, N.Y. A suitable subsystem for use in the present invention as the ABC modeling subsystem 36 is EasyABC available from ABC Technologies, Inc. located in Beaverton, Oreg.

A spreadsheet subsystem 38 is linked in data communication with other subsystems and databases and functions to summarize data from various sources for use in profitability analysis in the presentation subsystem 30. A suitable spreadsheet subsystem for use in the present invention is Excel made by Microsoft Corporation located in Redmond, Wash.

A product costing subsystem 40 applies activity based costing to individual products in product families to produce a more detailed analysis of ABC costs and profitability in each product family. A suitable software technology for the product costing subsystem 40 for use in the present invention is Quote-A-Profit® available from Manufacturing Management Systems, Inc. Of Madison, Ohio.

A relational database subsystem 52 is the primary data repository for the ABC data warehouse 42. The relational database 52 subsystem software coordinates the movement, storage, processing activation, and integration of the subsystem technologies into an information delivery system. A suitable subsystem for use as the relational database in the present invention is Visual FoxPro made by Microsoft Corporation, located in Redmond, Wash.

The relational database includes interconnected data tables that include a driver datamart 54. The driver datamart 54 is a relational database for storing summarized driver quantities by month from the manufacturing operations database 24. The data from the manufacturing operations database is extracted and then stored for use by other subsystems.

Another relational database interconnected within the relational database 53 is a product datamart 56. The product datamart is a relational database for storing product bills of material and routing specifications from the manufacturing operations database 24. The data from the manufacturing operations database is extracted and then stored for use by other subsystems.

Product costs and pricing data 62 and ABC reprocessed data 60 are also stored in the relational database 52 in the data warehouse 42. This stored data is also accessable by the other subsystem software components for processing. Additional data tables included in the relational database are summary data 58 and ABC reprocessed data 60.

Figure 2:
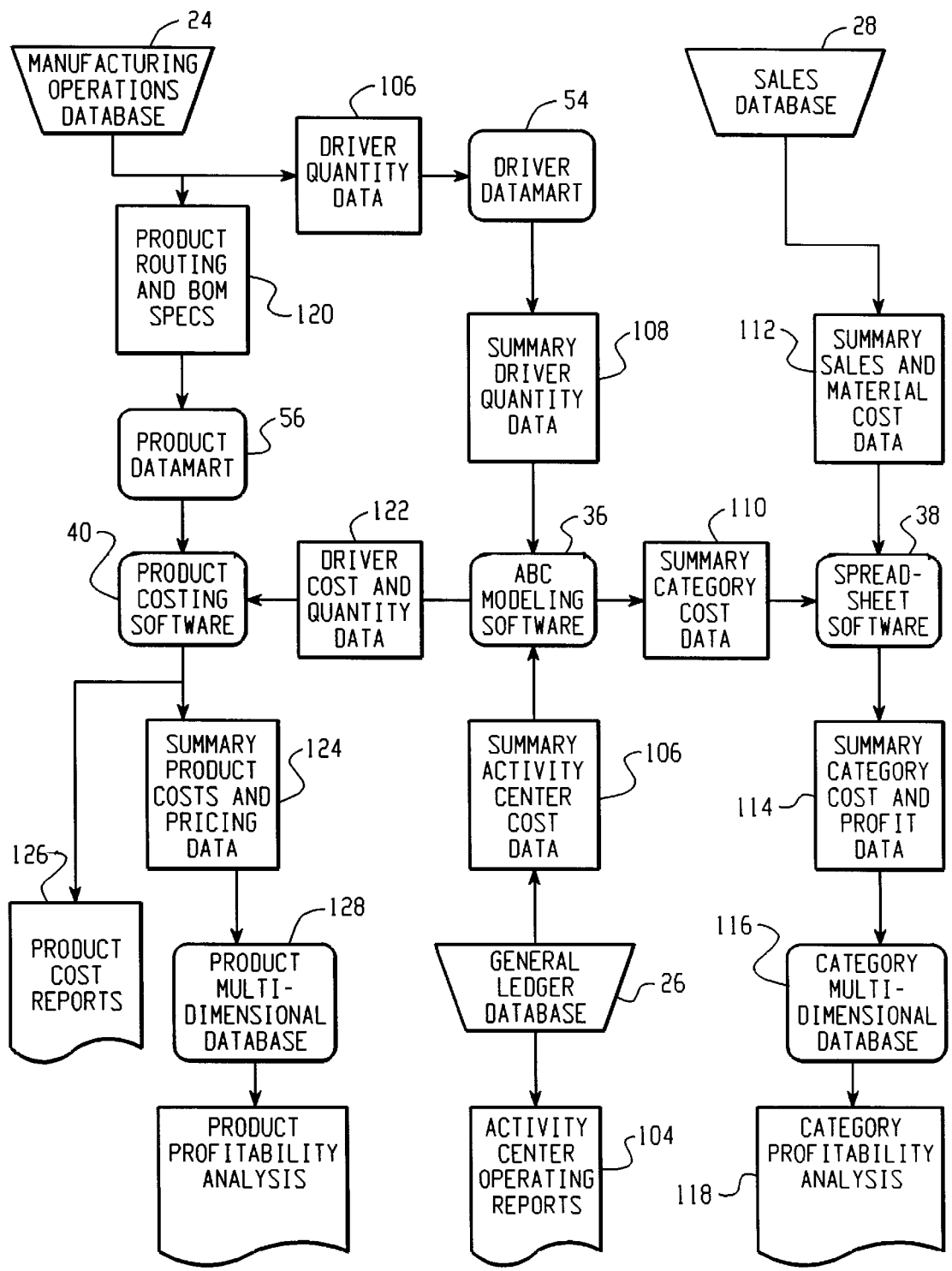
FIG. 2 is a schematic block diagram representing interconnections for data communication between system components of the invention illustrated in FIG. 1.

Referring to FIG. 2, a general overview of the control of data flow in accordance with the present invention between subsystems will be better appreciated. Recall that the financial data of the company is stored in the general ledger database 26. The financial data is stored according to a predetermined data structure that advantageously facilitates identifying financial data in accordance with activity based cost analysis techniques. Data obtained from the other databases is transformed into the same format for use in the present invention.

Figures 3, 4A, 4B, 4C, 4D:
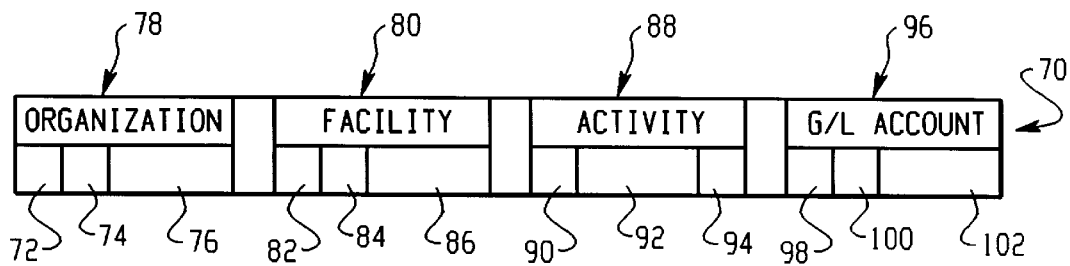

Referring now to FIG. 3, a suitable data field structure 70 for use in the present invention will be better appreciated. An organization code 72 is located in the first position in the data field 70. The organization code 72 corresponds to the largest business unit that provides services that affect costs for a product. A geographic category code 74 is next. The geographic category code 74 facilitates distinguishing between international, domestic, and regional business unit identification. A legal entity code 76 occupies the next four positions in the data field 70. The legal entity code 76 serves to allow for separation of individually identifiable legal entities, such as individual corporations held by the organization or business entities with separate federal identification numbers, e.g. a tax identification number. The six digits in the codes 72, 74, 76 are the referred to as the organizational code 78.

The next four digits comprise a facility code 80. The facility code 80 includes a group code 82. The group code allows for identification of the highest unit of organization within a business operation. A grouping is related business operations within an individual legal business entity, each group within the legal entity has a code. A division code 84 is the highest unit of organization within a group. A plurality of divisions within each group has individual division codes for each. A plant/site code 86 allows for identification of a production facility within a manufacturing division. The plant code 86 also allows for identifying other facilities such as warehouses, sales offices and other physical locations not otherwise identified as a plant warehouse or sales office.

An activity code 88 is the next segment in the data field structure. The activity code 88 includes an activity category 90 that facilitates identification of related groupings of activities performed within a business function. Activity categories 90 include direct production activities, plant support activities, and division support activities. An activity function 92 is a related grouping of activity centers within an activity category 90. Also included in the activity code 90 is an activity center code which functions to allow for identifying a highest level of activity to which people and equipment are assigned.

By way of example, and not as a limitation of scope of the present invention as claimed, the following outline provides a typical activity organization structure in a manufacturing operation as illustrated in the activity code 88 above.

TABLE 1

I. Activity Categories
    A. Direct Production Activity Category
        1. Machine shop activity function
            a. Production management activity center
            b. Drill and mill activity center
            c. Turning centers activity center
            d. Sheet metal activity center
        2. Electronic assembly activity function
            a. Production management activity center
            b. Instrumentation activity center
            c. Elements activity center
            d. Loads activity center
            e. Components activity center
        3. Testing activity function
            a. Standard test activity center
            b. High power test activity center
    B. Plant Support Activity Category
        1. Production support activity function
            a. Manufacturing management activity center
            b. Production planning activity center
            c. Quality control activity center
            d. Manufacturing engineering activity center
            e. Tool & die shop activity center
        2. Material support activity function
            a. Material management activity center
            b. Purchasing activity center
            c. Shipping and receiving activity center
            d. Incoming inspection activity center
            e. Stockroom activity center
            f. Paint shop activity center
        3. Other support activity function
            a. Building occupancy activity center
            b. Personnel activity center
            c. Maintenance activity center
    C. Division Support Activity Center
        1. Engineering support activity function
            a. Engineering management activity center
            b. Product engineering activity center
            c. Drafting activity center
            d. Laboratory activity center
        2. Sales support activity function
            a. Marketing management activity center
            b. Order entry activity center
            c. Customer service activity center
            d. Domestic sales activity center
            e. Export sales activity center
        3. Administrative support activity function
            a. General management activity center
            b. Financial management activity center
            c. Cost accounting activity center
            d. General accounting activity center
            e. Data processing activity center
            f. Employee relations activity center The next code in the data structure 70 is a general ledger account code 96. The general ledger account code 96 includes a general ledger category code 98. The general ledger category code 98 includes accounting categories to designate costs. In the preferred embodiment there are nine designations; assets, liabilities, equity, sales/cost of sales, manufacturing expenses, engineering expenses, research and development expenses, administrative expenses, other income and expenses. Each of the listed categories has an associated code number.

The next code is a resource category code 100. The resource category code includes costs and expenses associated with; salary & wages, benefits, equipment, supplies, utilities, professional services, computer services, building and other. The final code group is an account number 102. The account numbers 102 are costs incurred in each resource category 100. By way of example and not as a limitation in the scope of the claims of the present invention, the resource categories listed above have account codes as follows: (i) salary and wages; supervision, office, casual labor, paid absence (ii) benefits; group insurance, retirement plan, payroll taxes, training, miscellaneous fringe benefits, employee moving expense (iii) equipment; depreciation, rent/lease, maintenance and repair (iv) supplies; computer, office, other (v) utilities; electric, gas, water (vi) professional services; accounting, legal, data processing, other (vii) computer services; operational, support, software and systems, other (viii) building; depreciation, rent, lease, insurance, taxes, maintenance (ix) other; meals and entertainment, dues and subscriptions, pre-employment hiring expenses, telephone, travel, miscellaneous.

Referring back to FIG. 2, the general ledger database 26 stores data in the form of the data structure described above and provides the data for use in generating operating reports 104 for each activity center in each plant, division, and corporate function. Typical operating reports include dollars of expense for the current month and year to date period. The reports are organized by activity center, activity function, and category for each division or site throughout the enterprise. A percent column may also be included showing the %-to-total expenses for each activity center or activity function.

The general ledger database also provides data for the summary activity center cost data 106. Typical summary activity cost data 106 includes the plant, category, function, activity code numbers, and the dollars of expense by resource category for each activity center for a selected number of calendar or fiscal months within a period.

The summary activity cost data is imported into the ABC modeling software 36. The manufacturing operations database 24 provides driver quantity data 106 by significant product or service for each transaction driver. Examples of typical driver quantity data for a manufacturing company are units of material received, stored, or shipped. Numbers of persons employed, square feet of space occupied, amount of net sales dollars, number of man hours, number of purchase orders, number of shop orders, number of sales orders, number of customer returns, and number of requests for quotes from customers. An activity driver is determined from interviews with personnel and supervisors involved in carrying out a business activity on a day-to day basis. The driver is selected based on its assessed value as an accurate discriminator of costs in tracing expenses associated with the activity center to significant categories of products (product families). Quantities of driver transactions by product family are collected for a predetermined period of time. The total accumulated expenses for the activity center for the predetermined period of time is divided by the total driver quantity for the period of time to determine the unit driver cost for the period of time. This periodically determined unit driver cost is applied to driver quantities for each product family to assign costs from the activity center to the product family.

The driver quantity data is imported into the driver datamart 54. The driver datamart 54 is the source for summary driver quantity data 108. Examples of typical summary driver data includes; the driver type (e.g. unique to an activity center or shared and used by a plurality of activity centers), the driver name, the product family ID numbers and name, the actual driver quantity collected for each product family during the selected time period. The summary driver quantity data 108 is imported into the ABC modeling software 36.

The ABC modeling software 36 transforms the data imported from summary driver quantity data 108 and summary activity center cost data 106 into value added costs assigned by activity center to each significant category of products or services. Typical cumulative assigned costs represent the total cumulative cost assigned to each product family from each activity center within the enterprise, using the activity driver quantities and unit driver cost as the basis for assigning the costs. These costs are used to determine the operating profits by product family for the period involved. The ABC modeling software 36 is the source for summary category data 110 which is provided to the spreadsheet subsystem 38.

The sales database 28 provides sales accounting data for summary sales and material cost data 112. Typical data included in the summary sales and material cost data includes quantities shipped, gross sales, net sales, material cost of sales, subcontract cost of sales, and total standard cost of sales. which is organized according to significant category of products or services. The summary sales and material cost data 112 is imported into the spreadsheet subsystem 38. The spreadsheet subsystem processes the imported data and provides product category profitability data such as net sales, material cost of sales, direct production costs, support costs, and operating profit. This data is provided to summary category cost and profit data 114. This data is imported into a category multi-dimensional database 116 such as PowerPlay made by Cognos, Inc., located in Ottawa, Canada. The category multi-dimensional database 116 is used to generate different types of sales and profitability reports such as top ten, rank position, net change, proportion of business variance trend, and percent of plan.

The manufacturing operations database 24 provides data for product routing and bill of material specifications 120 for individual products and imports this data into the product datamart software 56. The product datamart software imports this data into the product costing subsystem 40. The driver unit costs and driver quantities by significant category of products 122 are imported into the product costing software 40. The product costing subsystem 40 processes the imported data to summary product cost and profit data 124 for individual products. Product cost reports 126 are produced from the product costing software 40. The summary product cost and profit data 124 is imported into a product multi-dimensional database 128 such as PowerPlay made by Cognos, Inc., located in Ottawa, Canada. The the presentation subsystem described above imports the category cost and profit data 114 and profit data 124 to produce multi-dimensional, drill down views of this data for strategic decision making.

Multi-dimensional enterprise wide analysis of a business or organization includes consideration of a plurality of factors. The factors include products, markets, customers, distribution channels, and time periods. Each factor is a dimension of the business organization. Combinations of these dimensions are used to form multi-dimensional representations of information relevant to the performance of the business. The multi-dimensional database subsystems 116, 128 combine the dimensions of the business described above for strategic analysis of the performance of the business. The dimensions may be combined selectively by a manager to produce the desired information. For example, and not as a limitation to the scope of the appended claims, a sales manager for a manufacturing business enterprise may desire to examine product sales for a selected time period through all distribution channels except for those to a specified geographic region. Another example of typical multi-dimensional analysis is the analysis of the market acceptance of a particular product across a target market but within specified age groups or income ranges.

The multi-dimensional database subsystems 116, 128 also provide drill down analysis. The subsystem products, described above for the multi-dimensional database subsystems 116, 128, organize the data within a dimension. Individual data items are grouped into hierarchical levels of detail. For example, a locations dimension contains data regarding country, regions, states, and cities. Each of these levels of detail are referred to as drill down levels in the hierarchy. The other dimensions of the business organization have similar hierarchical organization of data throughout the enterprise.

Referring to FIGS. 4A–4G, typical interconnected data tables for use in the relational database 52 of the present invention will be further appreciated. FIG. 4A shows a division table 140 containing data related to the organization of the business. The table 140 includes a division name 142, the division ID number 84, and the group ID number 82. The ID numbers 82 and 84 are portions of the data contained in the data structure 70 shown in FIG. 3. These portions of the data structure 70 are functioning of interlinking index between the tabular files used in the relational database 52 for the various tables illustrated in FIGS. 4A–4G. FIG. 4B shows a plant table 144 which includes a plant name 146, the plant ID number 86, and the division ID number 84. FIG. 4C illustrates an activity center table 148 that includes an activity center name 150, the activity center ID number 94, the plant ID number 86, the function ID number 92, a driver ID number 152, a month 154, the general ledger category code 98, and activity center costs 156 for the month 154. Referring to FIG. 4D, a product family data table 149 includes a product family ID number 160, a product family name 158, the division ID 84, a period 162, and product family costs 164. The period 162 is suitably updated quarterly, semi-annually, or annually but is updated semi-annually in the preferred emobidment. In FIG. 4E a sales data table 159 is shown which includes the family ID 160, the period 162, a sales amount 166 and material costs 168. A product data table 169 is illustrated in FIG. 4F. The product data table 169 includes a part number 170, the family ID 160, a list price 172, a discount a mount 174, and product costs 176. Referring to FIG. 4G, a driver data table 179 includes the driver ID number 152, a driver name 178, the month 154, the family ID, a driver quantity 180, the period 162, and a driver unit cost 182. As described above the numerous ID numbers interconnect the tables 140, 144, 148, 149, 159, 169, and 179 in the relational database 52.

Referring to FIGS. 5–10 a more detailed understanding of the control process and data flow of the present invention will be appreciated. Specifically, referring to FIG. 5, the overall control process of the present invention will be appreciated. In step 200 the process begins. In step 202, predetermined ABC relevant data is automatically extracted from the operational databases 24, 28, 26 and 32. The extraction of the relevant data is automated and executed by software programming in a manner known in the art. Some of the data extracted from the operational data systems for storage in the ABC data warehouse 42 includes the operating costs and driver transaction data by product family for each plant and division activity center. As activity centers are added to a division or plant this data is updated. As products are added or discontinued these data items are updated. Next, in step 204, the extracted data is cleansed and transformed into a format in accordance with the data tables illustrated in FIGS. 4A–4G. The cleansing of the data includes removing anomalies from the data such as spikes due to error or missing data. Cleansing data includes adding appropriate ID data structures to the operational data in accordance with the data structure 70 to identify the data in the tables described above. The process then proceeds to step 206 where the raw ABC selected data is stored in the data warehouse.

Figure 6:
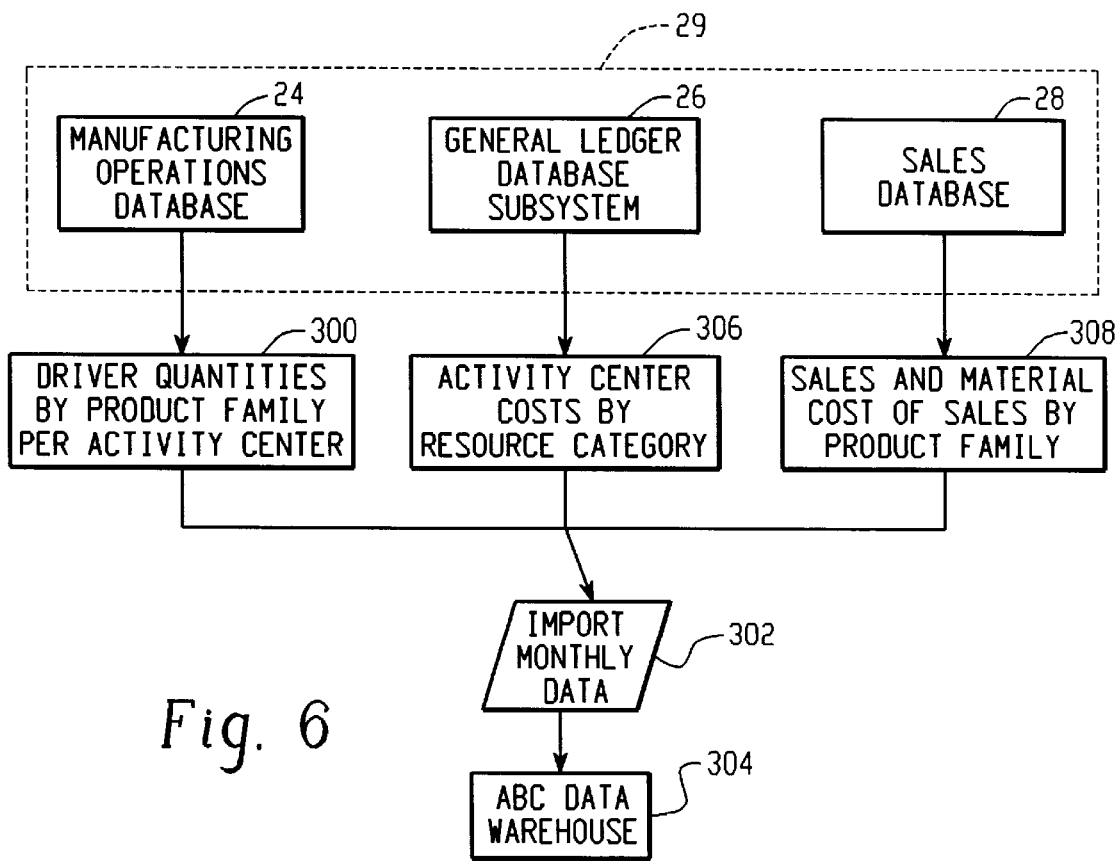
FIG. 6 is a data flow diagram illustrating a portion of the control process of FIG. 5.

Referring now to FIG. 6, the data flow of the raw unprocessed ABC selected data from the operational databases 29 will be appreciated. Each of the operational databases 24, 26, and 28 contains transactional data for use in managing the day-to-day manufacturing operations. Much of this data is narrow in scope and in the unprocessed form does not provide value for strategic decision making and analysis. The present invention extracts the ABC relevant data from the existing operational databases 29, without significant alteration to these systems, and re-groups the data into a relational database according to the specified table and data structures described above in FIGS. 3, and 4A–4G. In addition, subsystems process the extracted data into ABC meaningful quantities for use in strategic analysis and decision support.

The manufacturing operations database 24 in a typical manufacturing company may includes data such as; sales order no., customer no., sales class code, shop order no., part no., part description, order quantity, plant ID, work center no., work center description, machine no., machine description, department no., operation no., operation type, sequence no., resource code, quantity completed, quantity shipped, setup time, runtime, employee no., purchase order no., raw material no., raw material description, commodity code, inventory class code, quantity received, unit of measure, conversion factor, requisition no., vendor no., and standard unit price. Bills of material are also stored in the manufacturing operations data base 24. Typical bills of material include data such as; part no., part description, inventory class code, type code, unit of measure, conversion factor, inventory weight, last transaction date, component part no., component part description, sequence no., quantity per part no., shrinkage factor, operation factor. In addition, the routing specifications for a product are stored in the manufacturing operations database 24. Typical routing specifications data includes; part no., part description, plant ID, sequence code, resource code, operation no., operation description, work center no., setup time, runtime, conversion factor, labor rate code, lot factor, lot quantity, shrinkage factor, effective date, fixed tooling cost, and variable tooling cost.

The general ledger database subsystem 26 contains enterprise wide financial data indexed according to the data structure 70. Typical data stored in the subsystem 26 includes; company ID, division ID, plant ID, activity center ID, account number, account description, account type, debit/credit code, beginning balance, batch no., journal number, journal type, month end account balances, ending balance, and net change.

The sales and distribution database 28 includes; customer no., sales order no., order quantity, date ordered, salesman no., invoice no., invoice date, invoice amount, part no., part description, sales class code, unit list price, discount rate, unit net price, freight amount, material cost, direct production cost, support cost, and total cost.

In block 300, the driver quantities by product family per activity center are exported from the manufacturing database 24 and are stored in the driver datamart 54. In block 302, the values stored in the datamart 54 in block 300 are summarized and imported on a monthly basis into summary driver quantity data 108 (FIG. 2). In block 304, the summarized ABC monthly data is stored in the relational database 52 of the ABC data warehouse system 42. In block 306, the activity center costs by resource category is extracted from the raw ABC selected data is extracted the general ledger database subsystem 26 and stored in the data warehouse. The process proceeds to block 302 and continues as described above. In block 308, data from the sales database 28 is used to provide sales and material cost of sales by product family. The process continues on to block 302 and proceeds as described above.

Figure 5:
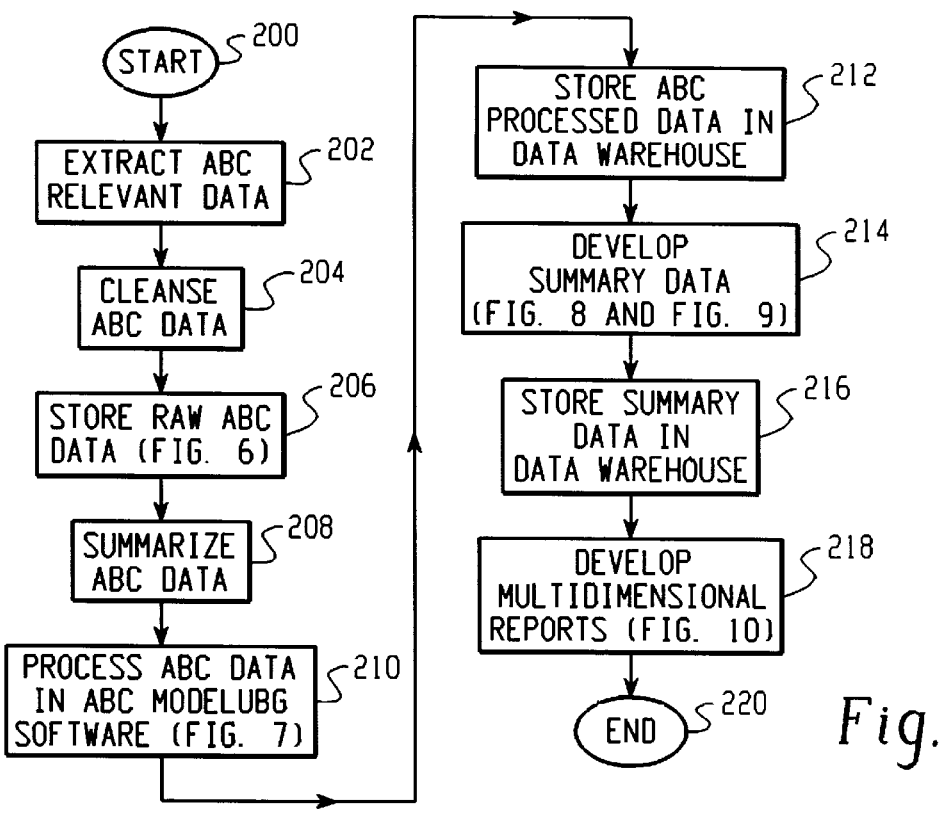
FIG. 5 is a flow chart illustrating the general control process of the present invention.

After all of the raw ABC specific data is imported in block 302 to the data warehouse shown in block 304 the control process proceeds to step 208 in FIG. 5. In step 208, the stored monthly ABC data is summarized over selected time periods, e.g. quarterly, semi-annual, and annual. The data is summed according to blocks 108 and 112 in FIG. 2. Once the monthly data is summed in step 208, the process proceeds to step 210 where the ABC modeling software 36 processes the extracted ABC data and the summarized ABC data.

Figure 7:
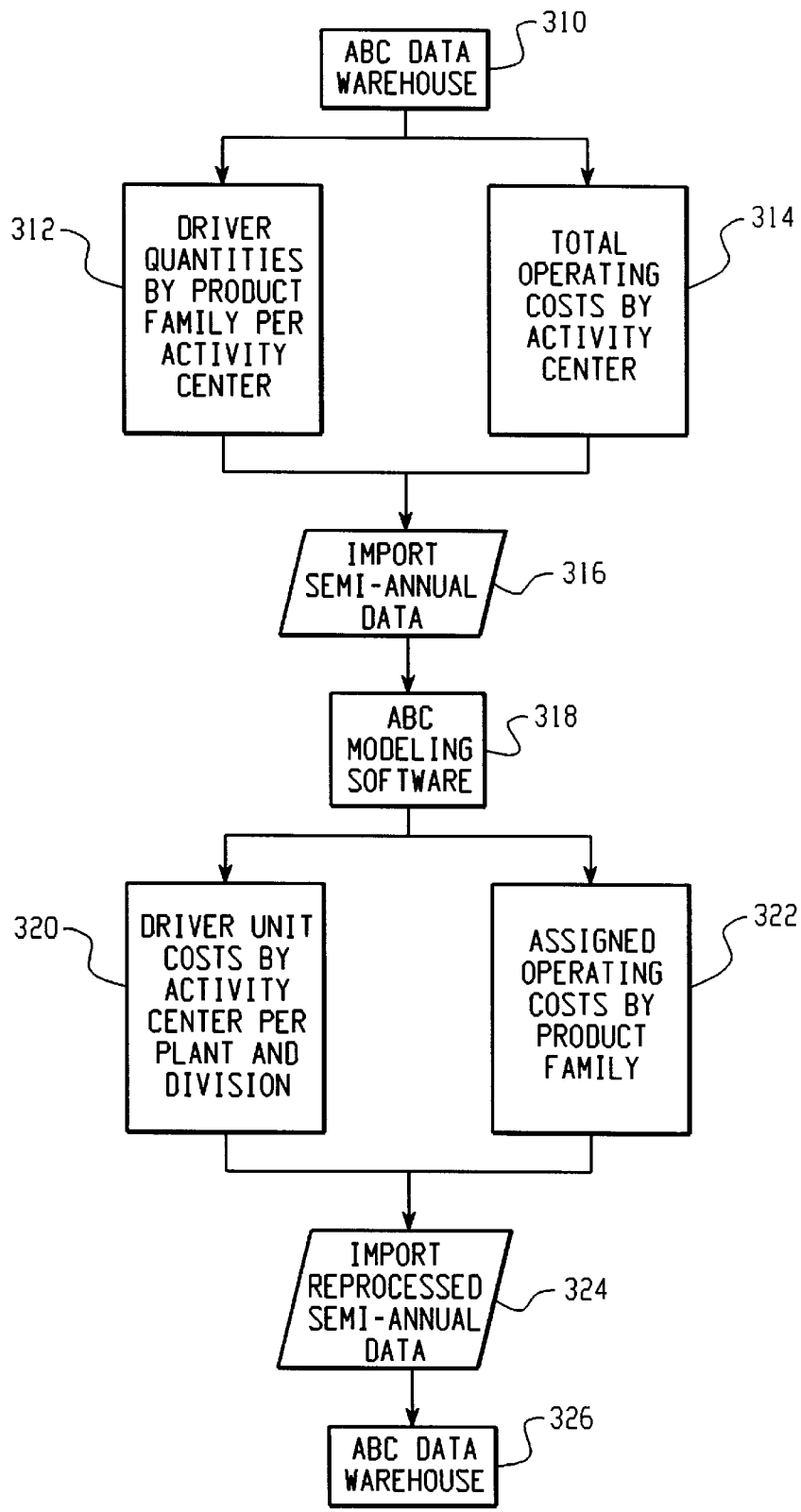
FIG. 7 is a data flow diagram illustrating a portion of the control process of FIG. 5.

Referring to FIG. 7, the data flow between the relational database 52 and the ABC modeling system 36 in step 210 will be better appreciated. In block 310, the relational database 52 provides driver quantities by product family per activity center. In block 312 these values are summed into semi-annual periods. The summarized semi-annual data is imported in block 316 to the ABC modeling software at block 318. Also in block 310, the relational database 52 provides total operating cost by activity center. In block 314 these values are summed into semi-annual periods. The summarized semi-annual data is imported in block 316 to the ABC modeling software at block 318.

From the ABC modeling software 36, in step 318, the following processed data is provided (i) block 320 represents driver unit costs by activity center per plant and division, and (ii) block 322 represents assigned operating costs by product family. The processed data represented in blocks 320 and 322 is summarized on a semi-annual basis in block 324 and imported in block 326 to be stored in the ABC data warehouse relational database 52, according to step 212 in FIG. 5.

Figure 8:
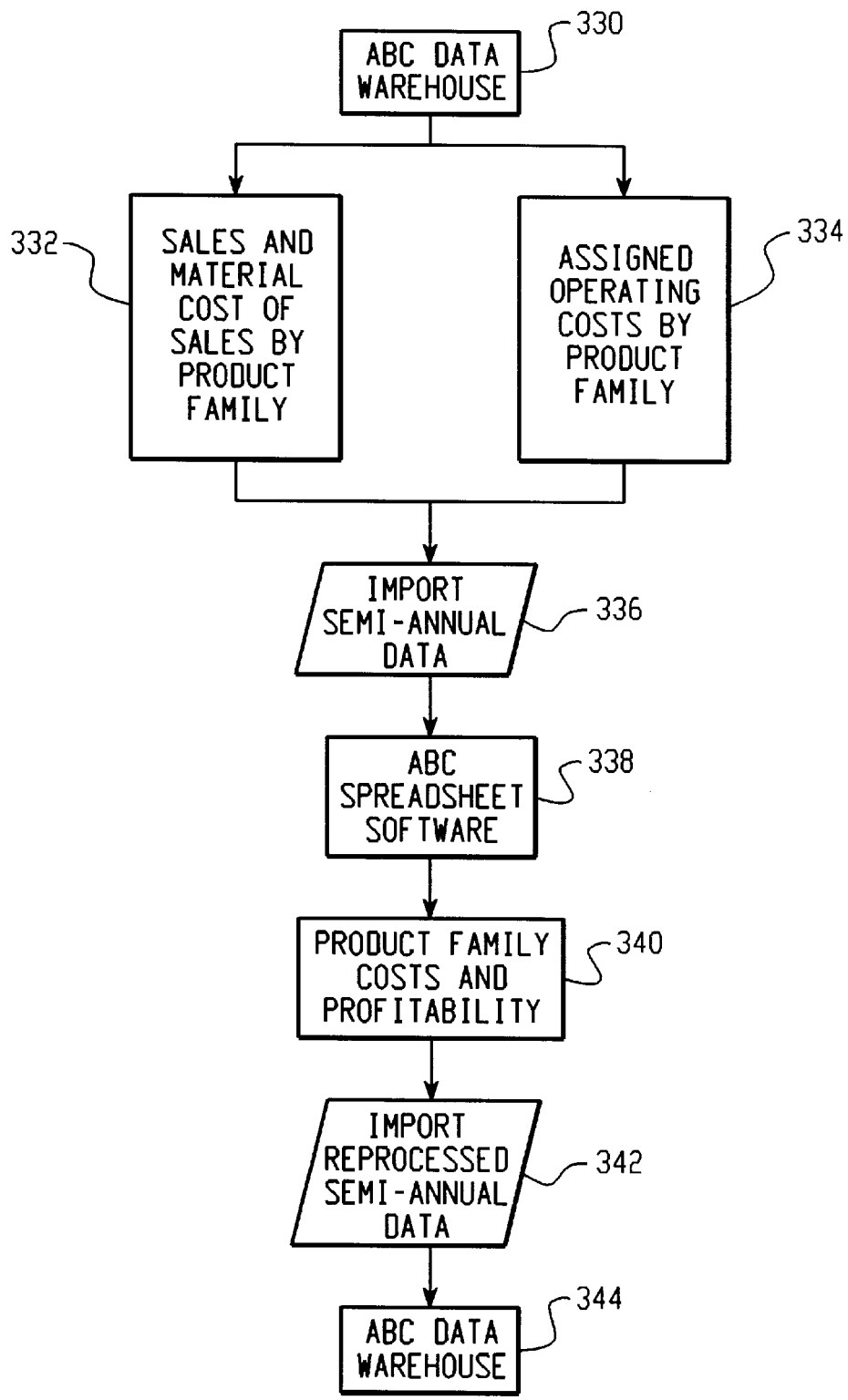
FIG. 8 is a data flow diagram illustrating a portion of the control process of FIG. 5.
Figure 9:
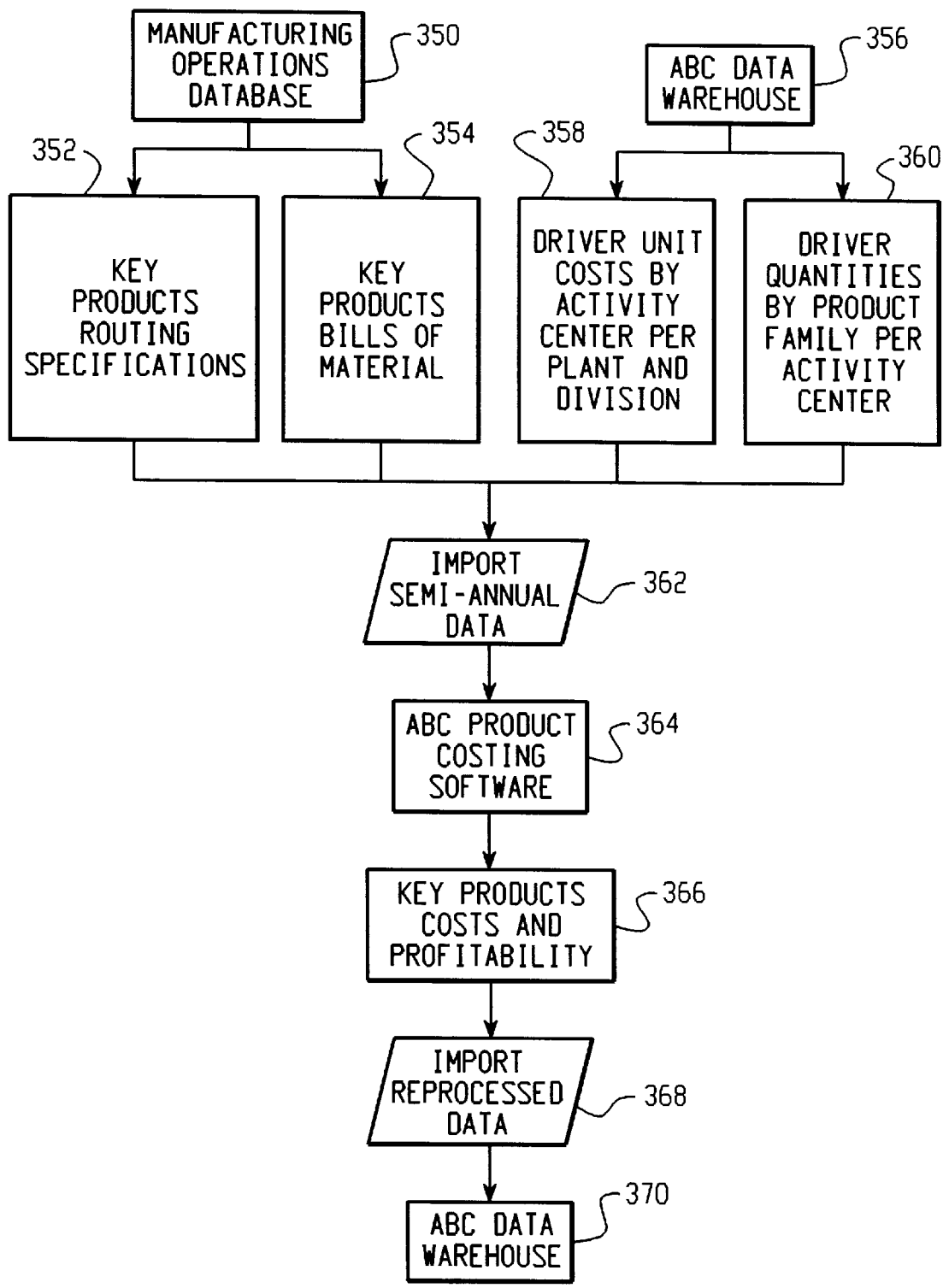
FIG. 9 is a data flow diagram illustrating a portion of the control process of FIG. 5.

In step 214, the data warehouse system 42 develops summary reports. Referring to FIGS. 8 and 9, the data flow within the data warehouse between the relational database 52 and the subsystems 38 and 40 will be better appreciated. Specifically, in FIG. 8, in block 330 the ABC data warehouse exports sales and material cost of sales by product family shown in block 332 and exports assigned operating costs by product family shown in block 334. The data from blocks 332 and 334 are summed over a semi-annual period in block 336 and imported into the ABC spreadsheet software 38 in block 338. In block 338, the ABC spreadsheet software 38 determines product family costs and profitability using the data imported and summed as described above. This data is summed on a semi-annual basis in block 342 and is returned to the appropriate data tables in the relational database 52 in block 344.

Referring to FIG. 9, the data flow between the manufacturing operations database 24, the relational database 52 in the data warehouse 42, and the ABC product costing subsystem 40 will be better understood. In block 350, the manufacturing database 24 exports the key products routing specification shown in block 352 and the key products bills of material shown in block 354. In block 356, the relational database 52 exports the driver costs by activity center per plant and division shown in block 358 and the driver quantities by product family per activity center shown in block 360. In block 362 the data shown in blocks 352, 354, 358, and 360 are summarized on a semi-annual basis and provided to the ABC product costing software 40 in block 364. The ABC product costing software 40 produces the key products costs and profitability in block 366. 370. Returning to FIG. 5, in step 216 the summarized data in block 368, the data produced in block 366, is imported into the relational database 52.

Figure 10:
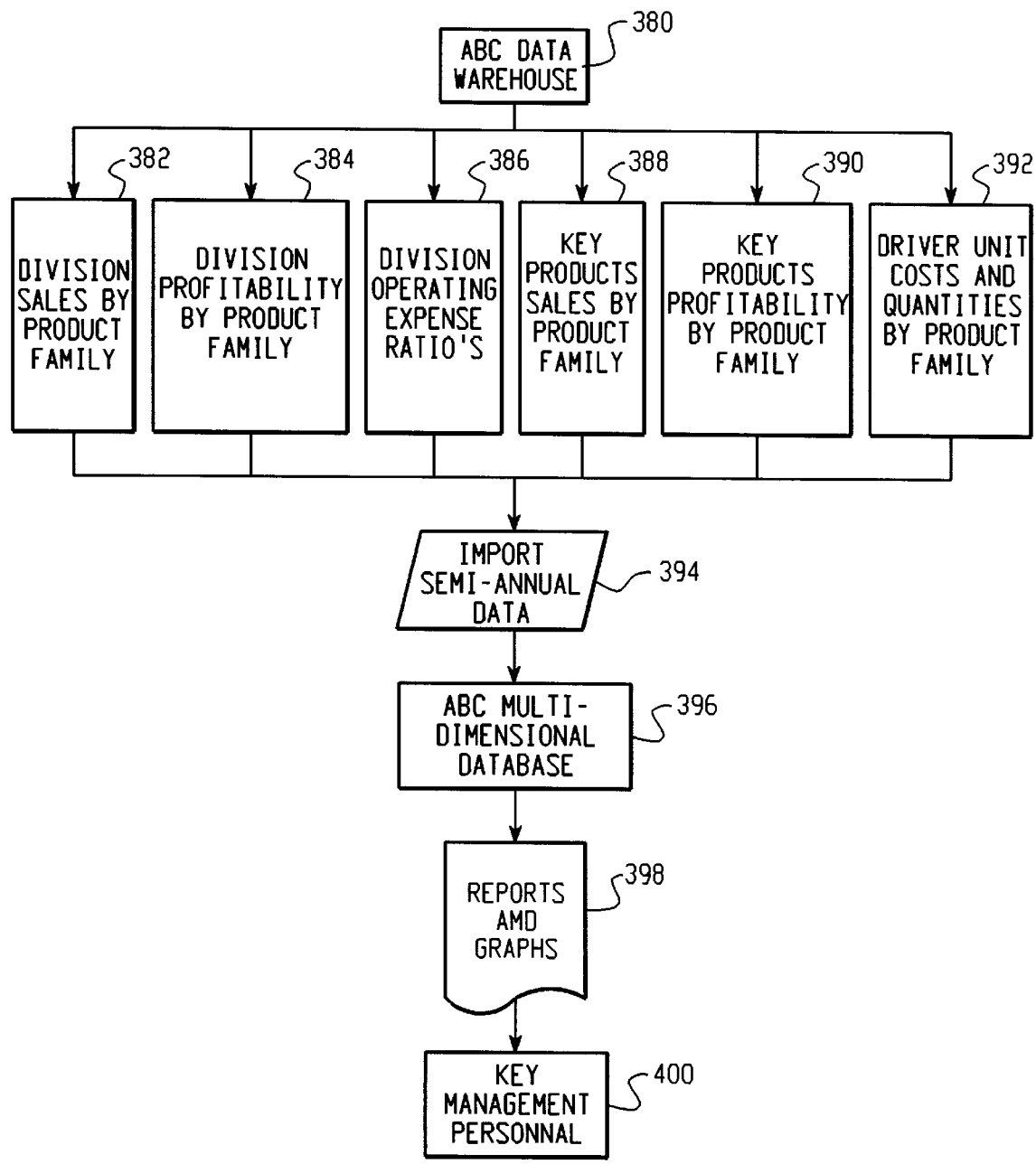
FIG. 10 is a partial data flow diagram illustrating the data flow in providing information for strategic decisions.

The process then proceeds to step 218 where multi-dimensional reports are requested and generated by management personnel. Referring to FIG. 10, the data flow between the relational database 52 in the data warehouse 42 and the presentation software 30 will be better understood. The presentation software 30 includes the multi-dimensional databases 116 and 128 shown in FIG. 2. In block 380, the data warehouse provides (i) division sales by product family in block 382, (ii) division profitability by product family in block 384, (iii) division operating expense ratio's in block 386, (iv) key products sales by product family in block 388, (v) key products profitability by product family in block 390, and (vi) driver unit cost and driver quantities by product family in block 392. The data from blocks 382, 384, 386, 388, 390, and 392 is summarized on a semi-annual basis in block 394 and the summarized data is provided to the ABC multidimensional data base presentation software 30 at block 396. The presentation software 30 generates selected reports and graphs shown in block 398 for use in strategic analysis and decision making by management personnel at block 400. The process proceeds to step 220 and ends.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. An information storage, processing, and reporting system for tracing enterprise wide product data, said system comprising:
    a data storage adapted for storing data related to a product;
    means adapted for receiving related data for a product from said data storage system;
    means for cataloging said related data about said product, by product families wherein said means for cataloging related data includes:
        means for identifying data elements related to selected product families;
        means for indexing said identified data elements which are related to a selected first product family in accordance with data representative thereof;
        means for grouping said indexed data elements pursuant to data representative of selected criterion, wherein said means for grouping includes means for grouping said data according to activity centers; and
        means adapted for storing said grouped data elements in a relational database;
    means for processing said grouped data elements in a digital processor in accordance with Activity Based Cost criteria; and
    means adapted for storing said processed data in a relational database structure.

2. The information storage, processing, and reporting system of claim 1 wherein the data storage includes a plurality of discrete data storage sub-systems.

3. The information storage, processing, and reporting system of claim 2 wherein each of said discrete data storage subsystems is adapted for storing a plurality of entries related to said product family in accordance with said data representative thereof.

4. The information storage, processing, and reporting system of claim 1 wherein the indexing means includes means for selecting activity based data elements related to at least one of said product families in accordance with said data representative thereof.

5. The information storage, processing, and reporting system of claim 4 wherein the means for grouping includes means for summing activity based data about said product families in accordance with said data representative thereof.

6. The information storage, processing, and reporting system of claim 1 wherein the means adapted for receiving related data for a product from said data storage stored in said plurality of discrete data storage sub-systems is automated.

7. The information storage, processing, and reporting system of claim 1 wherein the means for processing includes means for summarizing said data over a selected time period.

8. The information storage, processing, and reporting system of claim 1 wherein the means for grouping said related data includes grouping said data according to activity functions.

9. The information storage, processing, and reporting system of claim 1, wherein the means for grouping further includes grouping said data according to activity categories.

10. The information storage, processing, and reporting system of claim 1 wherein the means for processing includes means for determining a value associated with said product families in response to a driver value, said driver value being a measurable value.

11. An information storage, processing, and reporting method for tracing enterprise wide product data, said method comprising the steps of:
    storing data entries related to a product family;
    receiving the stored related data for a product;
    cataloging said related data about said product families wherein said step of cataloging related data includes the steps of:
        identifying data elements related to selected product families;
        indexing the identified data elements which are related to a selected first product family in accordance with data representative thereof;
        grouping said indexed data elements pursuant to data representative of selected criterion, the step of grouping including grouping said indexed data according to activity centers; and
        storing said grouped data elements in a relational database;
    processing said grouped data elements in a digital processor in accordance with Activity Based Cost criteria; and
    storing said processed data in a relational database structure.

12. The information storage, processing, and reporting method of claim 11 wherein the data is storage in a plurality of discrete data storage sub-systems.

13. The information storage, processing, and reporting method of claim 12 wherein each of said discrete data storage sub-systems stores a plurality of entries related to said product family in accordance with said data representative thereof.

14. The information storage, processing, and reporting method of claim 11 wherein the step of indexing includes the step of selecting activity based data elements related to at least one of said product families in accordance with said data representative thereof.

15. The information storage, processing, and reporting method of claim 14 wherein the step of grouping includes summing activity based data about said product families in accordance with said data representative thereof.

16. The information storage, processing, and reporting method of claim 11 wherein the step of receiving related data for a product from said data storage stored in said plurality of discrete data storage sub-systems is automated.

17. The information storage, processing, and reporting of claim 11 wherein the step of processing includes the step of summarizing said data over a selected time period.

18. The information storage, processing, and reporting method of claim 11 wherein the step of grouping related data includes grouping said data according to activity functions.

19. The information storage, processing, and reporting method of claim 11, wherein the step of grouping further includes grouping said data according to activity categories.

20. The information storage, processing, and reporting method of claim 11 wherein the step of processing includes the step of determining a value associated with said product family in response to a driver value, said driver value is a measurable value.

21. An information storage, processing, and reporting method according to claim 11, wherein said method further comprises the step of:
transferring said processed data to at least one of: a spreadsheet subsystem, and one or more multidimensional databases.

22. An industrial data acquisition and product costing system comprising:
means adapted for acquiring product data representative of at least one product, the product data including a data field representative of a product family to which each of an associated product belongs;
a data storage adapted for storing acquired product data;
comparison means adapted for isolating groups of product families in accordance with a testing of the product data against at least one of other product data and data representative of a family standard;
means adapted for selectively retrieving data representative of isolated groups of product families in accordance with tested product data;
means for retrieving preselected data representative of activity based costing data;
means for retrieving product data for each product of an isolated group of products; and
means for outputting data representative of the activity based costing data having been applied to retrieved product data on an isolated group of products.

23. The industrial data acquisition and product costing system of claim 22 wherein the means for acquiring product data includes means for acquiring the product data over a selected product data acquisition period.

24. The industrial data acquisition and product costing system of claim 23 wherein the comparison means further includes means for isolating groups of product families in accordance with at least one of: data representative of activity categories, data representative of activity functions, and data representative of activity centers.

25. An information storage, processing, and reporting system for tracing enterprise wide product data, said system comprising:
a data storage adapted for storing data related to a product;

means adapted for receiving related data for a product from said data storage system;
means for cataloging said related data by product families, wherein said means for cataloging related data includes:
means for identifying data elements related to selected product families;
means for indexing said identified data elements which are related to a selected first product family in accordance with data representative thereof;
means for grouping said indexed data elements pursuant to data representative of selected criterion; and
means adapted for storing said grouped data elements in a relational database;
means for processing said grouped data elements in a digital processor in accordance with Activity Based Cost criteria, said means for processing including means for determining a value associated with said product families in response to a driver value, said driver value being a measurable value; and
means adapted for storing said processed data in a relational database structure.

26. An information storage, processing, and reporting method for tracing enterprise wide product data, said method comprising the steps of:
storing data entries related to a product family;
receiving the stored related data for a product;
cataloging said related data about said product families wherein said step of cataloging related data includes the steps of:
identifying data elements related to selected product families;
indexing the identified data elements which are related to a selected first product family in accordance with data representative thereof;
grouping said indexed data elements pursuant to data representative of selected criterion; and
storing said grouped data elements in a relational database;
processing said grouped data elements in a digital processor in accordance with Activity Based Cost criteria, wherein the step of processing includes the step of determining a value associated with said product family in response to a driver value, said driver value being a measurable value; and
storing said processed data in a relational database structure.

27. An information storage, processing, and reporting system for tracing enterprise wide product data, said system comprising:
a data storage adapted for storing data related to a product;
means adapted for receiving related data for a product from said data storage system;
means for cataloging said related data by product families wherein said means for cataloging related data includes:
means for identifying data elements related to selected product families;
means for indexing said identified data elements which are related to a selected first product family in accordance with data representative thereof;
means for grouping said indexed data elements pursuant to data representative of selected criterion; and
means adapted for storing said grouped data elements in a relational database;

means for processing said grouped data elements in a digital processor in accordance with activity based cost criteria; and means adapted for storing said processed data in a relational database structure, wherein said processed data takes the form of a multi-field data structure including:
(1) business unit data identifying one or more business units of an organization,
(2) activity data representative of activities of the one or more business units, and
(3) accounting data associated with the one or more business units.

28. An information storage, processing, and reporting system according to claim 27, wherein said business unit data includes at least one of: data identifying the largest business unit that provides services that affect cost for a product, geographic identifier, legal entity identifier, data identifying the highest unit within a business operation, data identifying the highest unit of organization within a group, and data identifying facilities within an organization.

29. An information storage, processing, and reporting system according to claim 27, wherein said activity data includes at least one of: data identifying related groupings of activities performed within a business function, related grouping of activity centers within an activity category, data identifying a highest level of activity to which people and equipment are assigned.

30. An information storage, processing, and reporting system according to claim 27, wherein said accounting data includes at least one of: data identifying accounting categories to designate costs, data identifying costs and expenses associated with a resource category, and data identifying costs incurred in each resource category.

* * * * *